United States Patent

[11] 3,625,598

[72] Inventors Byron R. Brown
San Jose;
Kenneth Sanders, Campbell; Lester F. Shew, Los Gatos; Hans J. Zweig, Mission Viejo, all of Calif.

[21] Appl. No. 865,088
[22] Filed Oct. 9, 1969
[45] Patented Dec. 7, 1971
[73] Assignee International Business Machines Corporation
Armonk, N.Y.

[54] LIGHT BEAM DEFLECTOR
4 Claims, 6 Drawing Figs.

[52] U.S. Cl. .......... 350/299, 350/285
[51] Int. Cl. .......... G02b 5/08
[50] Field of Search .......... 350/6, 7, 150, 169, 171, 173, 266, 269, 285, 288, 299, 34

[56] References Cited
UNITED STATES PATENTS

| | | | |
|---|---|---|---|
| 1,792,766 | 2/1931 | Schroter | 88/14 I |
| 2,920,529 | 1/1960 | Blythe | 350/285 |
| 3,303,739 | 2/1967 | Chitagat | 350/7 |
| 3,366,795 | 1/1968 | Ravitsky et al. | 350/34 UX |

OTHER REFERENCES

Fleisher, " Digital Indexed Angular Light Deflection System," Oct. 1963, IBM Technical Disclosure Bulletin, Vol. 6, No. 5, pp. 32–34

*Primary Examiner*—David Schonberg
*Assistant Examiner*—Michael J. Tokar
*Attorney*—Hanifin and Jancin ABSTRACT: A light beam deflector system comprising parallel positioned movable mirrors, each backed by a fixed mirror, and positioned to deflect an incoming beam back and forth across a central axis. By moving the movable mirrors out of position at a selected station, the beam is permitted to pass on and be deflected by the fixed mirror, which offsets the beam position at the final station. Additionally, if desired, a series of masks may be provided between the target and the last deflecting station which finally aligns the beam with the target. The beam is larger than the size needed, and the mask blanks off the portion of the beam not needed and allows only that portion to pass through which is in direct alignment with the target area.

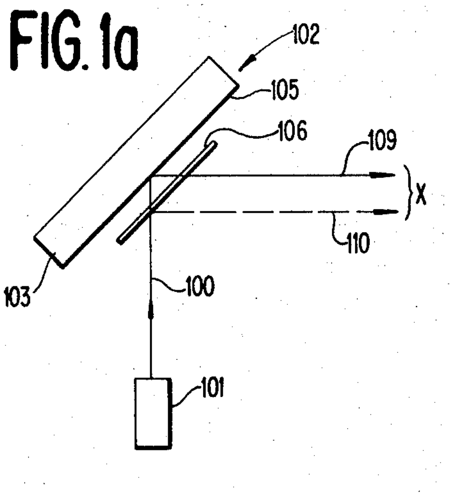
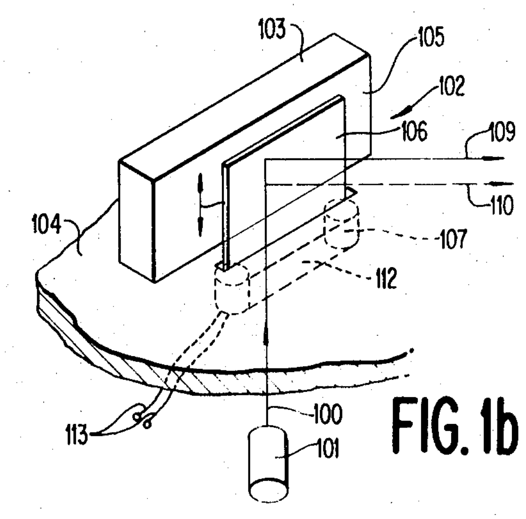
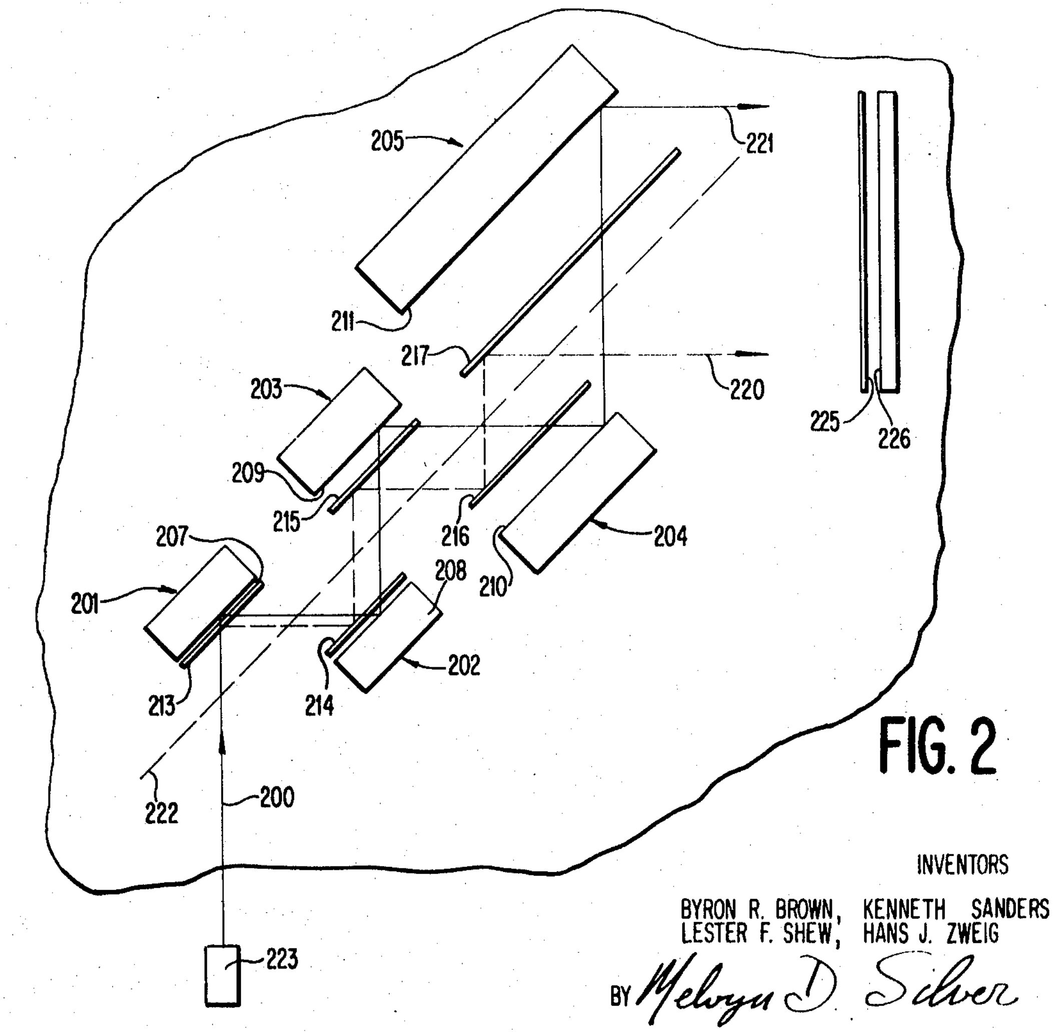
FIG. 1a
FIG. 1b
FIG. 2
INVENTORS
BYRON R. BROWN, KENNETH SANDERS
LESTER F. SHEW, HANS J. ZWEIG
BY Melvyn D. Silver
AGENT

LIGHT BEAM DEFLECTOR

FIELD OF THE INVENTION

Light deflectors in general, and more particularly, light deflectors specifically adapted to deflect the beam selectively along preselected paths. While not limited to this use, the invention is particularly adapted for offsetting the light beam along spaced parallel paths so that it can be focused on a memory element to record or read information on the element.

BACKGROUND OF THE INVENTION

High intensity light beams, such as from a laser, are being increasingly used for computer applications. One such application is in computer memory systems. Thus, the laser beam can be focused on the memory element to record or read information on the element.

A practical optical device must have the ability to be switched in a short period of time to any one of a number of positions for reading or recording purposes. This allows fewer sources of light to be utilized then would be necessary without the switching capability. Prior art beam deflecting devices have generally utilized mechanical means with some type of rotatable mirror, or some type of angularly deflecting mirror. Further, these systems have often involved lenses and prisms which impact the intensity of the light, and tend to increase dispersion. Thus, in general, the prior art has tended to use rotating mirrors to regulate or deflect the beam, with the angle of rotation determinative of the amount of beam displacement. This type of regulation has introduced errors in beam location due to angular oscillation, and in the precise mechanical means required to achieve proper angular rotation and displacement. Such systems, due to the above precise mechanical means employed, tend to be economically unfeasible, have inherent alignment problems, and tend to lose alignment with increasing use, requiring increasing maintenance costs.

SUMMARY OF THE INVENTION

Thus, an object of this invention is to regulate the positioning of a light beam in an improved manner by use of light deflector sets comprising a fixed and a movable mirror.

A further object is to adjust quickly the positioning of a light beam with a minimum loss of beam intensity.

Still another object is to deflect a light beam while maintaining the beam in a predetermined plane.

Another object is to adjust the positioning of a light beam along a desired number of paths where each path is equally spaced from each other path.

Yet another object is to adjust the positioning of a light beam with economic components having minimum alignment requirements.

These and other objects are met by the light deflector of this invention. Briefly stated, in one embodiment, this light deflector comprises a series of light deflector sets alternatingly located in relation to a central axis, across which the incoming light beam will be deflected, in a single plane. Each set comprises a stationary mirror and a movable mirror, with shifting means to move the movable mirror into and out of position in front of the stationary mirror. As desired then, the beam of light will be reflected either from the stationary or the movable mirror at each set to the stationary or movable mirror at the next set, crossing back and forth across the central axis. When the movable mirrors are plane mirrors, each parallel to its related plane stationary mirror, and the movable mirrors on each side of the axis are aligned in the same plane, and the proper spacing relationship between successive sets of mirrors is utilized, $2^n$ equally spaced beam positions are available, where $n$ equals the number of deflector sets used. The movable mirror is then the only moving part of the system, being raised into or lowered out of the light beam, in one embodiment, and requiring no angular rotation or angular alignment means.

A series of masks may be provided between the last deflection station and the target area for additional precise beam alignment.

While one embodiment of this invention has been briefly described above, this invention will best be understood in conjunction with the following drawings and general description.

IN THE DRAWINGS

FIG. 1*a* shows a top view of a single light deflector set of this invention in conjunction with a light source.

FIG. 1*b* shows a perspective view of a single light deflector set of this invention in conjunction with a light source.

FIG. 2 shows a series of light deflector sets for achieving 32 beam positions.

GENERAL DESCRIPTION

FIGS. 1*a* and 1*b*

Figure 5:
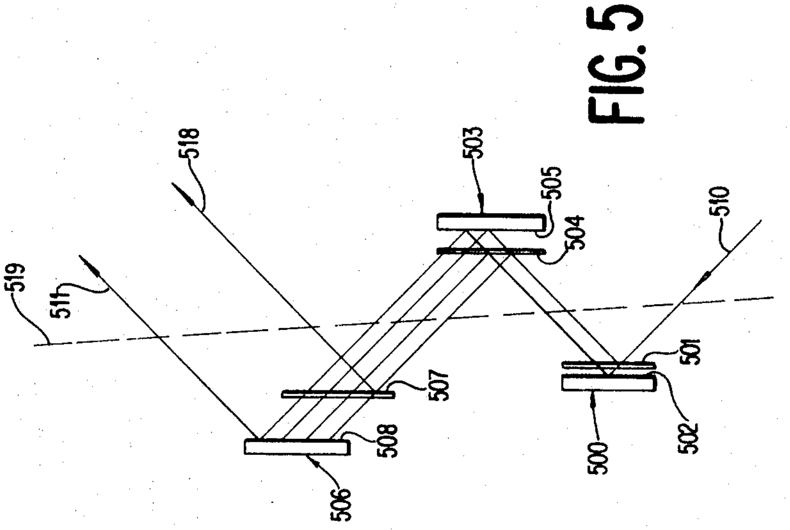
FIG. 5 shows a series of light deflector sets for achieving eight beam positions, wherein the mirrors are all in different planes.

FIGS. 1*a* and 1*b* show a single light deflector set of this invention. FIG. 1*a* shows a top view, and FIG. 1*b* a perspective view of the light deflector set.

A light beam 100, from a light source 101, such as a laser source, is impinged upon the light deflector set, generally designated as 102. The light deflector set 102 comprises a stationary mirror 103 attached to a mounting for holding to the frame 104. Once fixed in position, stationary mirror 103 is not movable. Located in front of the front face 105 of the stationary mirror 103 is a movable mirror 106. In the embodiment shown in FIG. 1*b*, movable mirror 106 is attached to a shifting means 112 to shift the movable mirror 106 into or out of the position of the incoming beam 100 in response to signals from an actuating means, not shown, via wires 113. As shown in FIG. 1*b*, this shifting means 112 allows the mirror 106 to be raised or lowered through the slot 107 into or out of the beam. This shifting means may comprise a solenoid mechanism, a spring mechanism, or any means for moving the mirror 106 into and out of the light beam.

In operation, when the movable mirror 106 is shifted out of the light beam, the beam is deflected as shown at position 109. When the movable mirror 106 is positioned into the light beam 100, reflection occurs as designated by the dotted line beam 110. It is also noted in FIGS. 1*a* and 1*b*, that the movable mirror 106 is not only positioned in front of the stationary mirror 103, but is so aligned with the mirror 103 as to be parallel to the stationary mirror 103. Thus, in the embodiment shown, both mirrors 106 and 103 are plane mirrors, aligned in parallel relation.

The light source 101 may be a laser light source, or any collimated source suitable for the means for which the beam will ultimately be used. The mirrors may be of glass, metal, or any known mirrors suitable for the purpose shown. Metal mirrors are most durable, and it is preferred that the mirrors reflect from their front rather than a back face.

Thus, a single light deflector set can cause a shift in the incoming beam 100 by the distance X as shown in FIG. 1*a*. The distance X is obviously related to the angle of incidence of the light beam 100 onto the plane mirrors, and the distance A between the movable mirror and the stationary mirror.

FIG. 2

FIG. 2 shows an embodiment of this invention utilizing five light deflector sets, in such a relationship as to achieve $2^5$ or 32 equally spaced beam positions from a single incoming beam. Further, each of these 32 positions is located in the same plane as the incoming beam. Incoming beam 200, from a light source 223 is directed toward the first of a series of light deflector sets which comprise the multistage light deflector of this embodiment. These light deflector sets are generally designated as 201–205, each of which comprises stationary mirrors 207–211, and a related movable mirror 213–217. The boundaries of the range of the positions available for the light to be deflected to is designated by the beams 220 and 221. Beam 220 is located by successive deflection as shown by the dotted line 220, from each of the movable mirrors being in position for that particular beam. Beam 221 achieves it position by successive deflection from the stationary mirrors, the path of the beam being shown by the solid line. Depending upon the combination of movable and stationary mirrors used to deflect any given beam, a total of 32 beam positions is available for the five mirrors shown, which positions are located between the spaced defined by beams 220 and 221. All of these beam positions will lie in the same plane. If it is desired to avoid overlapping, and at the same time have 32 beam positions equally spaced, a particular relationship is necessary between the movable mirrors and their related stationary mirrors and successive light deflector sets. Thus, if the distance between the movable mirror 213 and the stationary mirror 207, which comprise the first light deflector set to intercept the incoming beam, is the distance arbitrarily designated as A, the distance between movable mirror 214 and stationary mirror 208 which comprise the second set 202 in the series of light deflector sets, should be 2A.

The spacing for the next set, movable mirror 215 and stationary mirror 209, should be 4A, and for the third set, movable mirror 216 and stationary mirror 210, 8A, and for the last set, stationary mirror 211 and movable mirror 217, 16A. A further requirement to achieve equal spacing, however, is that the light deflector sets be so aligned that not only are the movable mirrors each in parallel relation to their related stationary mirrors, but that each of the light deflector sets on the same side of the central axis which the incoming beam will be deflected across be in parallel relation to each other, and in parallel relation on both sides of the central axis 222. In the embodiment of FIG. 2, this is done by having the movable mirrors on both sides of the central axis parallel to each other and on each side of the axis in the same plane. The central axis, as will be seen in FIGS. 2–5, is an arbitrarily drawn axis across which the light beam is deflected from one light deflector set located on one side of the central axis to a light deflector set located on the other side of the central axis. Thus, movable mirrors 213, 215, and 217 lie in one plane, while movable mirrors 214 and 216 lie in another plane.

To sum up the above system briefly, the multistage light deflector of FIG. 2 comprises a series of light deflector sets, wherein each light deflector set comprises a movable mirror to intercept an incoming light beam, positioned in front of a stationary mirror, with each movable mirror having shifting means for shifting the movable mirror into and out of the light beam as desired. Thus, the beam is reflected by the movable mirror when the movable mirror is shifted into the light beam and by the stationary mirror when the movable mirror is shifted out of the light beam. The movable mirror and stationary mirror should be plane mirrors for this embodiment, and the shifting means for shifting the movable mirror should be so aligned as to shift the movable mirror into a parallel relation with its related stationary mirror. The light deflector sets are alternatingly positioned on both sides of the central axis across which the light beam is to be successively deflected, with the light deflector sets further aligned so that the movable mirror of each light deflector set on the same side of a central axis is in the same plane, and the mirror of the sets on both sides of the central axis are in parallel relation. To achieve equal spacing, the movable mirrors are so positioned relative to the stationary mirrors that each successive stationary mirror is located at a distance of $2^m \times A$, where A is the distance between the movable mirror and the stationary mirror comprising the particular light deflector set located in the series of light deflector sets that first intercepts the incoming beam of light, and $m$ is the series number of that light deflector set, where $m$ equals zero for the first light deflector set to intercept the incoming beam, whereby a total of $2^{m+1}$ offset positions of equal spacing are achieved. Alternatively, for merely computing the number of offset positions available, let $n$ be taken as the total number of light deflector sets and $2^n$ positions are available.

During operation, each shifting means related to each light deflector set will respond to signals from an actuating means, which may be a computer controlled system. Thus, a single incoming beam may be deflected by any one or any given series or combination of mirrors, depending upon control signals to the shifting means from the actuating means.

The deflecting beams may impinge upon a mask means 225, located in front of a memory element 226, when used in a memory system. Optical memory systems are known in the art and will not be further discussed.

FIG. 3

Figure 3:
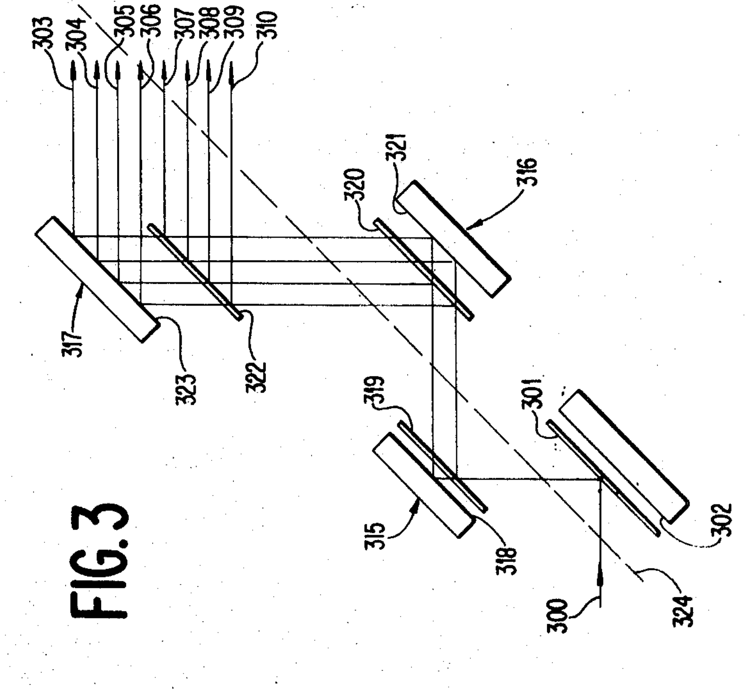
FIG. 3 shows beam tracings for eight of 16 possible positions for a four deflector set system.

FIG. 3 further illustrates how an incoming beam of light 300 impinging upon movable mirror 301, related to stationary mirror 302, may be formed into eight beams 303–310, of equal spacing, depending upon the particular series of movable mirrors or stationary mirrors and light deflector sets generally designated as 315, 316, and 317, are used. Light deflector set 315 comprises stationary mirror 318 and movable mirror 319; light deflector set 316 comprises movable mirror 320 and stationary mirror 321; and light deflector set 317 comprises movable mirror 322 and stationary mirror 323.

In operation, beam 300 deflected from movable mirror 301 back and forth across the central axis 324 can be ultimately located in any one of the eight positions designated 303–310, dependent upon that particular combination of movable and/or fixed mirrors from which it is reflected. When the beam is reflected from all movable mirror surfaces, as shown in FIG. 3, it will clearly be in the position designated 310. If it is successively reflected from stationary mirrors 318, 321, and 323, the beam will end up in the position designated as 303. The intermediate cases are also clearly shown in the drawing. Similarly, if the incoming beam 300 is deflected by stationary mirror 302, instead of by movable mirror 301, eight other positions would be available, for a total of 16 potential positions for the single incoming beam when four light deflector sets are used.

FIG. 4

Figure 4:
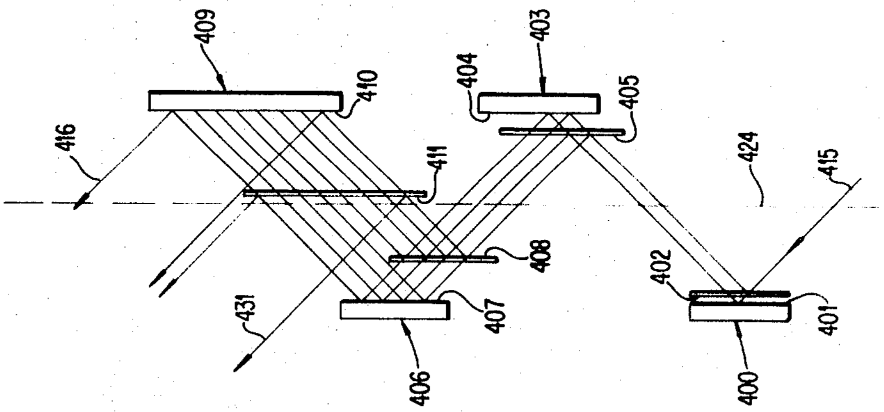
FIG. 4 shows a series of light deflector sets for achieving 16 beam positions, wherein the stationary mirrors of each set are in related planes.

FIG. 4 illustrates the situation when four sets of light deflector sets are utilized, but with the difference compared to FIG. 3, that the stationary mirrors lie in the same plane on opposite sides of a central axis. In FIG. 3, the movable mirrors were aligned in the same plane on each side of the central axis. Thus, in FIG. 4, light deflector set 400 comprises stationary mirror 401 and movable mirror 402; light deflector set 403 comprises stationary mirror 404 and movable mirror 405; light deflector set 406 comprises stationary mirror 407 and movable mirror 408; and light deflector set 409 comprises stationary mirror 410 and movable mirror 411. Stationary mirrors 407 and 401 line in the same plane, and stationary mirrors 410 and 404 lie in the same plane. As before, the movable mirrors are in parallel relation to their related stationary mirrors. Incoming beam 415 will, due to the use of four sets, after back and forth deflection across central axis 424, result in sixteen equally spaced beams lying in the same plane. These beams are designated as 416–431.

FIG. 5

FIG. 5 illustrates yet another embodiment of the invention, wherein light deflector sets 500, 503, and 506, each comprise a movable and stationary mirror, the movable mirrors being 501, 504, and 507, and the related stationary mirrors being 502, 505, and 508. As before, the movable mirrors are in parallel relation to their related stationary mirrors. In this embodiment, however, none of the movable mirrors or stationary mirrors lie in the same plane as with the previous FIGS. 1–4, although all are still in parallel relation and successive sets are located across central axis 519. However, both FIGS. 4 and 5 maintain the successive spacing between successive sets of mirrors, wherein the movable mirror is spaced from its related stationary mirror by increasing powers of 2, utilizing the spacing between the first movable mirror, here 501, and its related stationary mirror, here 502, as the basic measuring distance. Thus, incoming light beams 510 will result for this three light deflector set combination, in eight equally spaced beams designated 511–518.

SUMMARY

It is important to note that in all the preceding figures, showing various embodiments, the successive spacing relationship between the movable mirror and the stationary mirror must be maintained for equal spacing of the output beam positions. Further, while it may be convenient, it is not necessary that successive light deflector sets have their movable mirrors, or their stationary mirrors lying in the same plane, as shown in FIGS. 1–4. It is, however, important that where plane mirrors are used, as shown in FIGS. 1–5, each light deflector set be in parallel relation to each other light deflector set, as shown in FIG. 5, if equal distance spacing is desired. Thus, where equal distance spacing is required, successive light deflector sets must be in parallel relation, and must bear the spacing relationship between movable and stationary mirror. Simple geometric beam tracing quickly reveals that if a light deflector set is not parallel with the preceding series of light deflector sets, the equal distance spacing relationship of the outcoming or reflected beams in that set lose their equal distance spacing relationship. For certain applications, however, as equal distance spacing will not be necessary, this might be quite acceptable. Further, where successive light deflector sets are not in parallel relationship to other light deflector sets, adjustments can be made in the spacing of the outer movable mirror to stationary mirror relationship to achieve equal distance spacing.

If plane mirrors are not utilized, the reflection angles clearly will be different from that shown in FIGS. 1–5. Rapid beam positioning utilizing the movable mirror and a stationary mirror is still possible however. Computation of the position of final beam positions is, however, made more difficult. For certain applications, this again may be quite acceptable. The embodiments shown, however, are most desirable in that plane mirrors most readily available and most easily aligned, especially to achieve the parallel relationships previously discussed. Of course, an obvious requirement that exists is that the positioning of any light deflector set relative to the prior light deflector set must be such that both the movable mirror and the stationary mirror intercept the complete range of beams deflected from the prior light deflector set. Thus, referring back to FIG. 4, where the stationary mirrors are in parallel relationship on the same plane, for the spacing chosen in FIG. 4 between the movable mirrors and the stationary mirrors, only the four light deflectors shown may be utilized. Attempting to place a fifth light deflector set such that its stationary mirror would be aligned with stationary mirrors 407 and 401 in the same plane, would cause interference with light reflected from light deflector set 406, and thus would not be usable. However, an additional light deflector set outside of that particular plane could be interposed, which would convert FIG. 4 essentially into a modification of the system shown in FIG. 5. The particular layout of the light deflector sets for any given application must, of course, be geared to the function desired by the particular designer.

It is most convenient to operate the movable mirrors in an up and down position by use of solenoids. Solenoids are available that can give an operating cycle from approximately 1–5 milliseconds. This allows rapid beam positioning in response to an actuating mechanism to actuate the shifting means for the movable mirrors. The actuating means may be programmed or mechanically controlled.

As an additional feature, the light may be output from each of these systems onto the target through a mask, as shown in FIG. 2, which may be precisely aligned over the target. If the opening in the mask is smaller than the beam size at that position, precise alignment is obtained, lessening the tolerances necessary in alignment of the prior light deflector sets. If the target area size on a recording medium is one-half or less the size of the beam from the light deflector set, then the mask may have two or more alignment positions for each beam, thus increasing the number of beam positions available for recording or reading. Thus, for example, for a 7 unit light deflector set, having a mask having two positions for each output beam position, 256 positions are available starting with a single incoming light beam, all of which are aligned in the same plane.

Thus, this invention allows the positioning of a light beam in an improved manner by the use of light deflector sets that comprise a fixed and a movable mirror. Further, there is a minimum loss of light beam intensity by the use of the reflector surfaces. The initial incoming beam may be focused in a predetermined plane and need not be disturbed. Equal distance spacing of the final beams may be achieved if desired. The system, further, offers economy in construction, as plane mirrors are economical, are easily aligned in parallel relationship to each other, and the mechanical means utilized for the movable mirrors are many and varied, although solenoid positioning is a preferred embodiment. The use of metal mirrors is also desired as these are rugged, and the stationary mirrors may be machined directly into a baseplate, rigidly attached thereto, in a secure manner.

While the invention has been particularly shown and described with reference to preferred embodiments thereof, it will be understood by those skilled in the art that various changes in the form and details may be made therein without departing from the spirit and scope of the invention.

What is claimed is:

1. A multistage light deflector for controlling the position of a light beam to any one of a desired number of positions, comprising:

a series of light deflector sets, said light deflector sets comprising a movable mirror to intercept an incoming light beam, positioned in front of a stationary mirror, and shifting means responsive to an actuating means for shifting said movable mirror into and out of the light beam to reflect the beam by said movable mirror when said movable mirror is shifted into the light beam and to reflect the beam by said stationary mirror when said movable mirror is shifted out of the light beam, said movable mirror and said stationary mirror being plane mirrors, said shifting means being so aligned as to shift said movable mirrors into parallel relation to said stationary mirrors;

said series of light deflector sets alternatingly positioned in parallel relation on both sides of a central axis across which the light beam is to be successively deflected;

said series of light deflector sets so aligned that said movable mirror of each of said light deflector sets is in parallel relation to each other to successively deflect an incoming beam of light across the central axis from the first to each succeeding light deflector set comprising said series of light deflector sets, and further aligned to position said movable mirror of each of said light deflector sets on the same side of the central axis in the same plane;

said movable mirrors so positioned relative to said stationary mirrors to successively locate each of said stationary mirrors from said movable mirrors at a distance of $2^m A$, where A is the distance between said movable mirror and said stationary mirror comprising said light deflector set located in said series of light deflector sets to first intercept the incoming beam of light, and $m$ is the series number of said light deflector set, where $m=0$ for the first of said light deflector sets to intercept the incoming beam, whereby $2^{m+1}$ desired offset positions of equal spacing may be achieved in response to control signals to said shifting mans from said actuating means.

2. A multistage light deflector for controlling the position of a light beam comprising:

a series of light deflector sets, said light deflector sets comprising a movable mirror to intercept an incoming light beam, positioned in front of a stationary mirror, and shifting means responsive to an actuating means for shifting said movable mirror into and out of the light beam to reflect the beam by said movable mirror when said movable mirror is shifted into the light beam and to reflect the beam by said stationary mirror when said movable mirror is shifted out of the light beam, said movable mirror and said stationary mirror being plane mirrors, said shifting means being so aligned as to shift said movable mirrors into parallel relation to said stationary mirrors;

said series of light deflector sets alternatingly positioned in parallel relation on both sides of a central axis across which the light beam is to be successively deflected;

said series of light deflector sets so aligned that said movable mirror of each of said light deflector sets is in parallel relation to each other to successively deflect an incoming beam of light across the central axis from the first to each succeeding light deflector set comprising said series of light deflector sets, back and forth across the central axis, and further aligned to position said stationary mirror of each of said light deflector sets on the same side of the central axis in the same plane;

said movable mirrors so positioned relative to said stationary mirrors to successively locate each successive of said stationary mirrors from said movable mirrors at a distance of $2^m$A, where A is the distance between said movable mirror and said stationary mirror comprising said light deflector set located in said series of light deflector sets to first intercept the incoming beam of light, and $m$ is the series number of said light deflector set, where $m$=0 for the first of said light deflector sets to intercept the incoming beam, whereby an incoming beam of light may be offset to any one of an equally spaced desired number of positions in response to control signals to said shifting means from said actuating means.

3. A multistage light deflector for controlling the position of a light beam to any one of a desired number of positions comprising:

a series of light deflector sets, said light deflector sets comprising a movable mirror to intercept an incoming light beam, positioned in front of a stationary mirror, and shifting means responsive to an actuating means for shifting said movable mirror into and out of the light beam to reflect the beam by said movable mirror when said movable mirror is shifted into the light beam and to reflect the beam by said stationary mirror when said movable mirror is shifted out of the light beam, said movable mirror and said stationary mirror being plane mirrors, said shifting means being so aligned as to shift said movable mirrors into parallel relation to said stationary mirrors;

said series of light deflector sets alternatingly positioned in parallel relation on both sides of a central axis across which the light beam is to be successively deflected;

said series of light deflector sets so aligned to successively deflect an incoming beam of light across the central axis from the first to each succeeding light deflector set comprising said series of light deflector sets;

whereby an incoming beam of light may be offset to any one of a desired number of positions in response to control signals to said shifting means from said actuating means.

4. The multistage light deflector of claim 2 wherein said movable mirrors are so positioned relative to said stationary mirrors to successively locate each successive of said stationary mirrors from said movable mirrors at a distance of $2^m$A, where A is the distance between said movable mirror and said stationary mirror comprising said light deflector set located in said series of light deflector sets to first intercept the incoming beam of light, and $m$ is the series number of said light deflector set, and $m$=0 for the first of said light deflector sets to intercept the incoming beam, whereby an incoming beam of light may be offset to any one of an equally spaced desired number of positions in response to control signals to said shifting means from said actuating means.

* * * * *